(12) United States Patent

Agrawal et al.

(10) Patent No.: US 12,651,273 B2

(45) Date of Patent: Jun. 9, 2026

(54) SYSTEM AND METHOD FOR QUESTIONNAIRE DATA DIGITIZATION AND RECONCILIATION

(71) Applicant: JPMorgan Chase Bank, N.A., New York, NY (US)

(72) Inventors: Ashish Agrawal, Hyderabad (IN); Miltiadis Mitrakas, Essex (GB); Ian Yi Seaw, Singapore (SG); Yu Tsuneoka, Kanagawa-Ken (JP); Alex Astle, Jersey City, NJ (US); Rahul Kalia, Hong Kong (HK); Riya Ojha, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 245 days.

(21) Appl. No.: 18/491,175

(22) Filed: Oct. 20, 2023

(65) Prior Publication Data

US 2025/0124464 A1 Apr. 17, 2025

(30) Foreign Application Priority Data

Oct. 11, 2023 (GR) ............................... 20230100835

(51) Int. Cl.
*G06Q 30/0203* (2023.01)
*G06F 40/103* (2020.01)
(Continued)

(52) U.S. Cl.
CPC ....... *G06Q 30/0203* (2013.01); *G06F 40/103* (2020.01); *G06V 30/191* (2022.01); *G06V 30/30* (2022.01); *G06V 30/41* (2022.01)

(58) Field of Classification Search
None
See application file for complete search history.

(56) References Cited

U.S. PATENT DOCUMENTS

| | | | | |
|---|---|---|---|---|
| 11,416,861 | B1 * | 8/2022 | Hubley | .............. G06Q 20/4014 |
| 2009/0055270 | A1 * | 2/2009 | Magdon-Ismail | .... G06F 16/957 |
| | | | | 705/14.27 |

(Continued)

OTHER PUBLICATIONS

"The Wolfsberg Group Correspondent Banking Due Diligence Questionnaire (CBDDQ) Guidance" Feb. 2023 (Year: 2023).*

(Continued)

*Primary Examiner* — Darlene Garcia-Guerra

(74) *Attorney, Agent, or Firm* — GREENBLUM & BERNSTEIN, P.L.C.

(57) ABSTRACT

Various methods and processes, apparatuses/systems, and media for questionnaire data digitization and reconciliation are disclosed. A processor generates an autonomous program for continuously monitoring shared mailbox for unread emails having questionnaire data containing a plurality of line items filled out by a client; converts, by utilizing an OCR tool, the questionnaire data containing the plurality of line items into a machine-readable format data; reads, by utilizing an automated reconciliation tool, the machine-readable format data for each line item; compares, by utilizing the automated reconciliation tool, data for each line item against a corresponding predefined guidance data; identifies, based on comparing, missing response data, negative response data, and insufficient response data corresponding to the questionnaire data filled out by the client by applying predefined rules; and automatically reconciles the missing response data, negative response data, and insufficient response data.

8 Claims, 8 Drawing Sheets

(51) Int. Cl.
    *G06V 30/19*           (2022.01)
    *G06V 30/30*           (2022.01)
    *G06V 30/41*           (2022.01)

(56)                 References Cited

U.S. PATENT DOCUMENTS

| | | | |
|---|---|---|---|
| 2011/0096983 A1* | 4/2011 | Jensen | G06V 30/268 |
| | | | 382/187 |
| 2017/0228827 A1* | 8/2017 | Lobana | G06Q 40/00 |
| 2018/0144314 A1* | 5/2018 | Miller | G06Q 20/405 |
| 2018/0349776 A1* | 12/2018 | Raamadhurai | G06Q 40/12 |
| 2019/0370388 A1* | 12/2019 | Li | G06F 40/295 |
| 2020/0020015 A1* | 1/2020 | Anders | G06Q 10/083 |
| 2022/0245732 A1* | 8/2022 | Dixon | G06F 16/27 |
| 2022/0351112 A1* | 11/2022 | Mochty | G06Q 10/0635 |
| 2022/0405836 A1* | 12/2022 | Gorman | G06Q 40/12 |
| 2023/0195716 A1* | 6/2023 | Caudill | G06F 16/2379 |
| | | | 707/690 |
| 2023/0252372 A1* | 8/2023 | Singh | G06Q 10/08 |
| | | | 705/7.11 |

OTHER PUBLICATIONS

Cochinwala, Munir, et al. "Efficient data reconciliation." Information Sciences 137.1-4 (2001): 1-15 (Year: 2001).*
Bakhtouchi, Abdelghani. "Data reconciliation and fusion methods: A survey." Applied Computing and Informatics 18.3/4 (2022): 182-194 (Year: 2022).*

* cited by examiner

200

300

500

| # | | | | Summary/notes |
|---|---|---|---|---|
| 1 | 94% | Successful | 334/334 fields analyzed as expected | None |
| 2 | 90% | Successful | | The only one error was result of OCR reading "5" and "6". |
| 3 | 54% | Fail | 333/334 fields analyzed as expected | The original image quality was too low and the tool cannot generate any meaningful result |
| 4 | 98% | Successful | 334/334 fields analyzed as expected | None |
| 5 | 72% | Fail | | The client tampered with the original CBDDQ format and OCR cannot locate the client response |
| 6 | 63% | Fail | | The client tampered with the original CBDDQ format and OCR cannot locate the client response |
| 7 | OCR cannot process | Fail | | OCR cannot process |
| 8 | 92% | Successful | 332/334 fields analyzed as expected | The original CBDDQ had overlapping responses (client response was overlapping with tables) |
| 9 | 95% | Successful | 334/334 fields analyzed as expected | None |
| 10 | 95% | Successful | 334/334 fields analyzed as expected | None |
| 11 | 87% | Successful | 334/334 fields analyzed as expected | None |
| 12 | OCR cannot process | Fail | | OCR cannot process |
| 13 | OCR cannot process | Fail | | OCR cannot process |
| 14 | 95% | Successful | 334/334 fields analyzed as expected | None |
| 15 | 95% | Successful | | None |
| 16 | 90% | Successful | | None |

| page_idx | page_nam | field_name | box | value | value_conf | blank | blank_confidence | errors | options |
|---|---|---|---|---|---|---|---|---|---|
| 3 | 3 | 19_a | [715, 276, | Yes | 0.956925 | FALSE | 0.043075256 | | Yes|No| |
| 3 | 3 | 19_b | [715, 330, | Yes | 0.967675 | FALSE | 0.032324753 | | Yes|No| |
| 3 | 3 | 19_c | [715, 382, | Yeas | 0.659024 | FALSE | 0.340976105 | | Yes|No| |
| 3 | 3 | 19_d | [715, 436, | Yes | 0.964989 | FALSE | 0.03501292 | | Yes|No| |
| 3 | 3 | 19_e | [715, 490, | Yes | 0.95784 | FALSE | 0.042160339 | | Yes|No| |
| 3 | 3 | 19_f | [715, 541, | Yes | 0.927468 | FALSE | 0.072532349 | | Yes|No| |
| 3 | 3 | 19_g | [715, 597, | Yes | 0.956496 | FALSE | 0.043504105 | | Yes|No| |
| 3 | 3 | 19_h | [715, 650, | Yes | 0.960662 | FALSE | 0.039937845 | | Yes|No| |
| 3 | 3 | 19_i | [715, 705, | Yes | 0.955027 | FALSE | 0.044973221 | | Yes|No| |
| 3 | 3 | 19_j | [715, 758, | Yes | 0.966245 | FALSE | 0.033755341 | | Yes|No| |

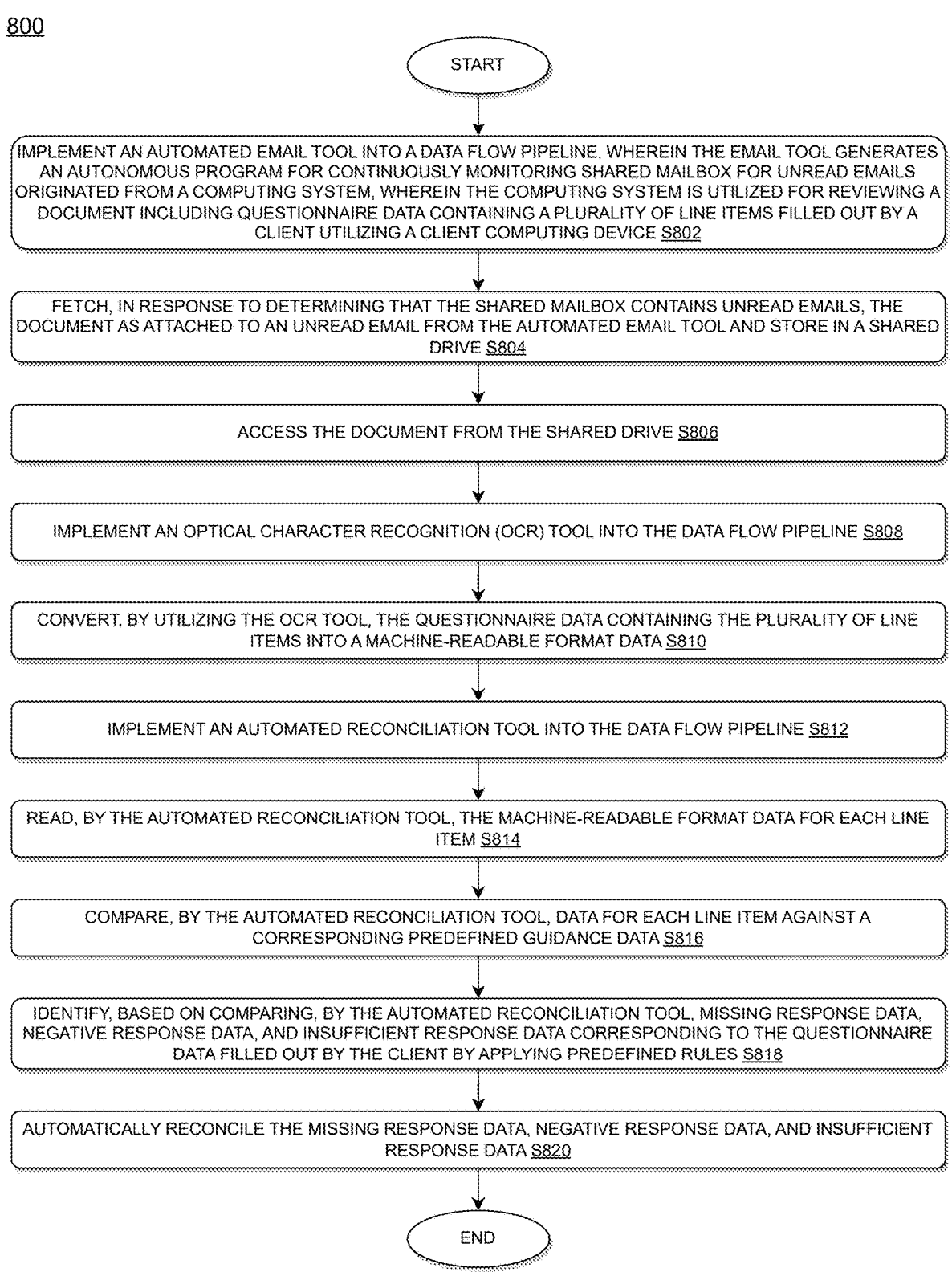

START

IMPLEMENT AN AUTOMATED EMAIL TOOL INTO A DATA FLOW PIPELINE, WHEREIN THE EMAIL TOOL GENERATES AN AUTONOMOUS PROGRAM FOR CONTINUOUSLY MONITORING SHARED MAILBOX FOR UNREAD EMAILS ORIGINATED FROM A COMPUTING SYSTEM, WHEREIN THE COMPUTING SYSTEM IS UTILIZED FOR REVIEWING A DOCUMENT INCLUDING QUESTIONNAIRE DATA CONTAINING A PLURALITY OF LINE ITEMS FILLED OUT BY A CLIENT UTILIZING A CLIENT COMPUTING DEVICE S802

FETCH, IN RESPONSE TO DETERMINING THAT THE SHARED MAILBOX CONTAINS UNREAD EMAILS, THE DOCUMENT AS ATTACHED TO AN UNREAD EMAIL FROM THE AUTOMATED EMAIL TOOL AND STORE IN A SHARED DRIVE S804

ACCESS THE DOCUMENT FROM THE SHARED DRIVE S806

IMPLEMENT AN OPTICAL CHARACTER RECOGNITION (OCR) TOOL INTO THE DATA FLOW PIPELINE S808

CONVERT, BY UTILIZING THE OCR TOOL, THE QUESTIONNAIRE DATA CONTAINING THE PLURALITY OF LINE ITEMS INTO A MACHINE-READABLE FORMAT DATA S810

IMPLEMENT AN AUTOMATED RECONCILIATION TOOL INTO THE DATA FLOW PIPELINE S812

READ, BY THE AUTOMATED RECONCILIATION TOOL, THE MACHINE-READABLE FORMAT DATA FOR EACH LINE ITEM S814

COMPARE, BY THE AUTOMATED RECONCILIATION TOOL, DATA FOR EACH LINE ITEM AGAINST A CORRESPONDING PREDEFINED GUIDANCE DATA S816

IDENTIFY, BASED ON COMPARING, BY THE AUTOMATED RECONCILIATION TOOL, MISSING RESPONSE DATA, NEGATIVE RESPONSE DATA, AND INSUFFICIENT RESPONSE DATA CORRESPONDING TO THE QUESTIONNAIRE DATA FILLED OUT BY THE CLIENT BY APPLYING PREDEFINED RULES S818

AUTOMATICALLY RECONCILE THE MISSING RESPONSE DATA, NEGATIVE RESPONSE DATA, AND INSUFFICIENT RESPONSE DATA S820

END

FIG. 8

SYSTEM AND METHOD FOR QUESTIONNAIRE DATA DIGITIZATION AND RECONCILIATION

CROSS-REFERENCE TO RELATED APPLICATIONS

This application claims the benefit of priority from Greek Patent Application No. 20230100835, filed Oct. 11, 2023, which is herein incorporated by reference in its entirety.

TECHNICAL FIELD

This disclosure generally relates to data processing, and, more particularly, to methods and apparatuses for implementing a platform, language, cloud, and database agnostic data digitization and reconciliation module configured to convert questionnaire data into a machine-readable format and identifying missing as well as insufficient responses based on predefined guidelines.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to performance analysis, report generation, project tracking, and competitive analysis, to name but a few. In general, large enterprises, corporations, agencies, institutions, and other organizations are facing a continuing problem of handling, processing, and/or accurately describing a vast amount of data that are crucial to plan actions in an efficient and expedited manner.

For example, data processing team at a large organization may be responsible for supporting banking clients from foreign countries. As part of this function, the data processing team (i.e., case leads) typically reviews Correspondent Banking Due Diligence Questionnaire (CBDDQ). The CBDDQ instructions establish that the Questionnaire should be populated at the Legal Entity (LE) level, e.g., at the ultimate parent or head office, subsidiary level. The answers populated are to reflect the LE perspective, but need to also capture information on behalf of each of its branches. Should any differences exist between the LE and one (1) of its branches, the specific differences need to be highlighted and captured in the Questionnaire.

It may be noteworthy that today's CBDDQ is a 20-page document which may include 110 questions and a total of 330-line items which may provide banks with in-depth information on the Anti Money Laundering (AML) Program of their clients. During periodic renewals or when new business are being on-boarded, the case lead and middle office spends significant time and effort to review this document. They identify AML Risks as well as look for missing responses to questions and are sent back to the client for mitigation. This effort may prove to be extremely laborious, and points missed initially could mean that the client is contacted multiple times, thereby deteriorating the client experience.

Thus, there is a need for an advanced method and tools that can address these conventional shortcomings corresponding to data digitization and reconciliation.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic data digitization and reconciliation module configured to convert questionnaire data into a machine-readable format and identifying missing as well as insufficient responses based on predefined guidelines, but the disclosure is not limited thereto. According to exemplary embodiments, the questionnaire data may include CBDDQ data, but the disclosure is not limited thereto. For example, the questionnaire data may include any data requiring a response without departing from the scope of the present disclosure.

According to exemplary embodiments, a method for questionnaire data digitization and reconciliation by utilizing one or more processors along with allocated memory is disclosed. The method may include: implementing an automated email tool into a data flow pipeline, wherein the email tool generates an autonomous program for continuously monitoring shared mailbox for unread emails originated from a computing system, wherein the computing system is utilized for reviewing a document including questionnaire data containing a plurality of line items filled out by a client utilizing a client computing device; fetching, in response to determining that the shared mailbox contains unread emails, the document as attached to an unread email from the automated email tool and storing in a shared drive; accessing the document from the shared drive; implementing an optical character recognition (OCR) tool into the data flow pipeline; converting, by utilizing the OCR tool, the questionnaire data containing the plurality of line items into a machine-readable format data; implementing an automated reconciliation tool into the data flow pipeline; reading, by the automated reconciliation tool, the machine-readable format data for each line item; comparing, by the automated reconciliation tool, data for each line item against a corresponding predefined guidance data; identifying, based on comparing, by the automated reconciliation tool, missing response data, negative response data, and insufficient response data corresponding to the questionnaire data filled out by the client by applying predefined rules; and automatically reconciling the missing response data, negative response data, and insufficient response data.

According to exemplary embodiments, in automatically reconciling, the method may further include: filtering the missing response data among response data filled out by the client; and grouping the missing response data into a first file.

According to exemplary embodiments, the method may further include: filtering the negative response data among the response data filled out by the client; and grouping the negative response data into a second file.

According to exemplary embodiments, the method may further include: filtering the insufficient response data among the response data filled out by the client; and grouping the insufficient response data into a third file.

According to exemplary embodiments, the method may further include: transmitting the first file, the second file, and the third file as output to the client computing device via a communication interface; receiving input data from client corresponding to each of the missing response data, the negative response data, and the insufficient response data; and repeating the converting process, the reading process, the comparing process, the identifying process, and the automatically reconciling process on the received input data.

According to exemplary embodiments, wherein the questionnaire data may include Correspondent Banking Due Diligence Questionnaire (CBDDQ) data.

According to exemplary embodiments, the method may further include: implementing artificial intelligence and machine learning algorithm into the automated reconciliation tool for automatically reconciling the missing response data, negative response data, and insufficient response.

According to exemplary embodiments, a system for questionnaire data digitization and reconciliation is disclosed. The system may include: a processor; and a memory operatively connected to the processor via a communication interface, the memory storing computer readable instructions, when executed, may cause the processor to: implement an automated email tool into a data flow pipeline, wherein the email tool generates an autonomous program for continuously monitoring shared mailbox for unread emails originated from a computing system, wherein the computing system is utilized for reviewing a document including questionnaire data containing a plurality of line items filled out by a client utilizing a client computing device; fetch, in response to determining that the shared mailbox contains unread emails, the document as attached to an unread email from the automated email tool and store in a shared drive; access the document from the shared drive; implement an OCR tool into the data flow pipeline; convert, by utilizing the OCR tool, the questionnaire data containing the plurality of line items into a machine-readable format data; implement an automated reconciliation tool into the data flow pipeline; read, by the automated reconciliation tool, the machine-readable format data for each line item; compare, by the automated reconciliation tool, data for each line item against a corresponding predefined guidance data; identify, based on comparing, by the automated reconciliation tool, missing response data, negative response data, and insufficient response data corresponding to the questionnaire data filled out by the client by applying predefined rules; and automatically reconcile the missing response data, negative response data, and insufficient response data.

According to exemplary embodiments, in automatically reconciling, the processor may be further configured to: filter the missing response data among response data filled out by the client; and group the missing response data into a first file.

According to exemplary embodiments, the processor may be further configured to: filter the negative response data among the response data filled out by the client; and group the negative response data into a second file.

According to exemplary embodiments, the processor may be further configured to: filter the insufficient response data among the response data filled out by the client; and group the insufficient response data into a third file.

According to exemplary embodiments, the processor may be further configured to: transmit the first file, the second file, and the third file as output to the client computing device via a communication interface; receive input data from client corresponding to each of the missing response data, the negative response data, and the insufficient response data; and repeat the converting process, the reading process, the comparing process, the identifying process, and the automatically reconciling process on the received input data.

According to exemplary embodiments, the processor may be further configured to: implement artificial intelligence and machine learning algorithm into the automated reconciliation tool for automatically reconciling the missing response data, negative response data, and insufficient response.

According to exemplary embodiments, a non-transitory computer readable medium configured to store instructions for questionnaire data digitization and reconciliation is disclosed. The instructions, when executed, may cause a processor to perform the following: implementing an automated email tool into a data flow pipeline, wherein the email tool generates an autonomous program for continuously monitoring shared mailbox for unread emails originated from a computing system, wherein the computing system is utilized for reviewing a document including questionnaire data containing a plurality of line items filled out by a client utilizing a client computing device; fetching, in response to determining that the shared mailbox contains unread emails, the document as attached to an unread email from the automated email tool and storing in a shared drive; accessing the document from the shared drive; implementing an OCR tool into the data flow pipeline; converting, by utilizing the OCR tool, the questionnaire data containing the plurality of line items into a machine-readable format data; implementing an automated reconciliation tool into the data flow pipeline; reading, by the automated reconciliation tool, the machine-readable format data for each line item; comparing, by the automated reconciliation tool, data for each line item against a corresponding predefined guidance data; identifying, based on comparing, by the automated reconciliation tool, missing response data, negative response data, and insufficient response data corresponding to the questionnaire data filled out by the client by applying predefined rules; and automatically reconciling the missing response data, negative response data, and insufficient response data.

According to exemplary embodiments, in automatically reconciling, the instructions, when executed, may cause the processor to further perform the following: filtering the missing response data among response data filled out by the client; and grouping the missing response data into a first file.

According to exemplary embodiments, the instructions, when executed, may cause the processor to further perform the following: filtering the negative response data among the response data filled out by the client; and grouping the negative response data into a second file.

According to exemplary embodiments, the instructions, when executed, may cause the processor to further perform the following: filtering the insufficient response data among the response data filled out by the client; and grouping the insufficient response data into a third file.

According to exemplary embodiments, the instructions, when executed, may cause the processor to further perform the following: transmitting the first file, the second file, and the third file as output to the client computing device via a communication interface; receiving input data from client corresponding to each of the missing response data, the negative response data, and the insufficient response data; and repeating the converting process, the reading process, the comparing process, the identifying process, and the automatically reconciling process on the received input data.

According to exemplary embodiments, the instructions, when executed, may cause the processor to further perform the following: implementing artificial intelligence and machine learning algorithm into the automated reconciliation tool for automatically reconciling the missing response data, negative response data, and insufficient response.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates an exemplary table of output data generated by the platform, language, database, and cloud agnostic data digitization and reconciliation module of FIG. 4 in accordance with an exemplary embodiment.

FIG. 7 illustrates another exemplary table of output data generated by the platform, language, database, and cloud agnostic data digitization and reconciliation module of FIG. 4 in accordance with an exemplary embodiment.

FIG. 8 illustrates an exemplary flow chart of a process implemented by the platform, language, database, and cloud agnostic data digitization and reconciliation module of FIG. 4 for systemically and dynamically converting questionnaire data into a machine-readable format and identifying missing as well as insufficient responses based on predefined guidelines in accordance with an exemplary embodiment.

DETAILED DESCRIPTION

Figure 1:
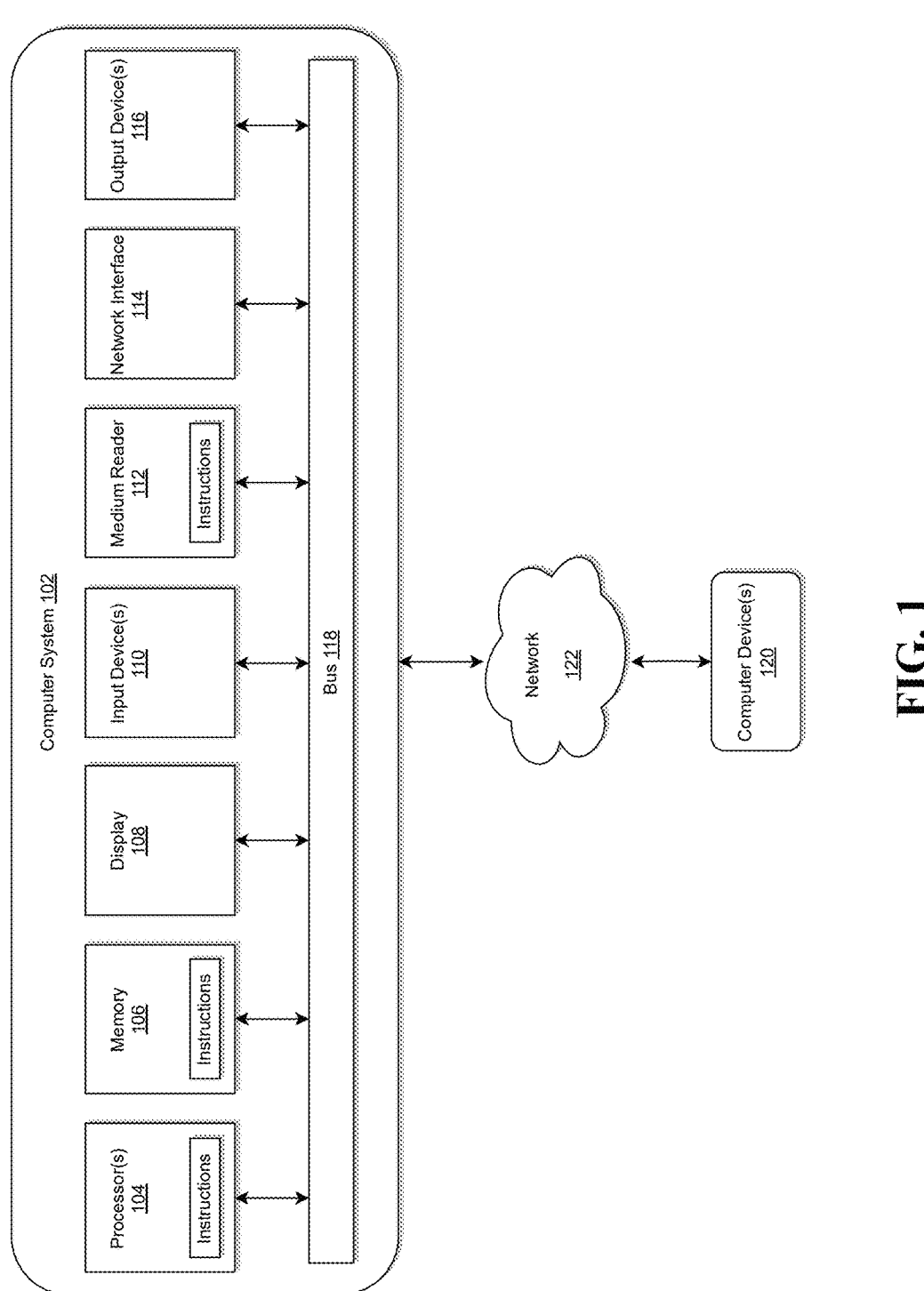
FIG. 1 illustrates a computer system for implementing a platform, language, database, and cloud agnostic data digitization and reconciliation module configured to systemically and dynamically convert questionnaire data into a machine-readable format and identifying missing as well as insufficient responses based on predefined guidelines in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic data digitization and reconciliation module configured to automatically and dynamically convert questionnaire data into a machine-readable format and identifying missing as well as insufficient responses based on predefined guidelines in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the data digitization and reconciliation module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the data digitization and reconciliation module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
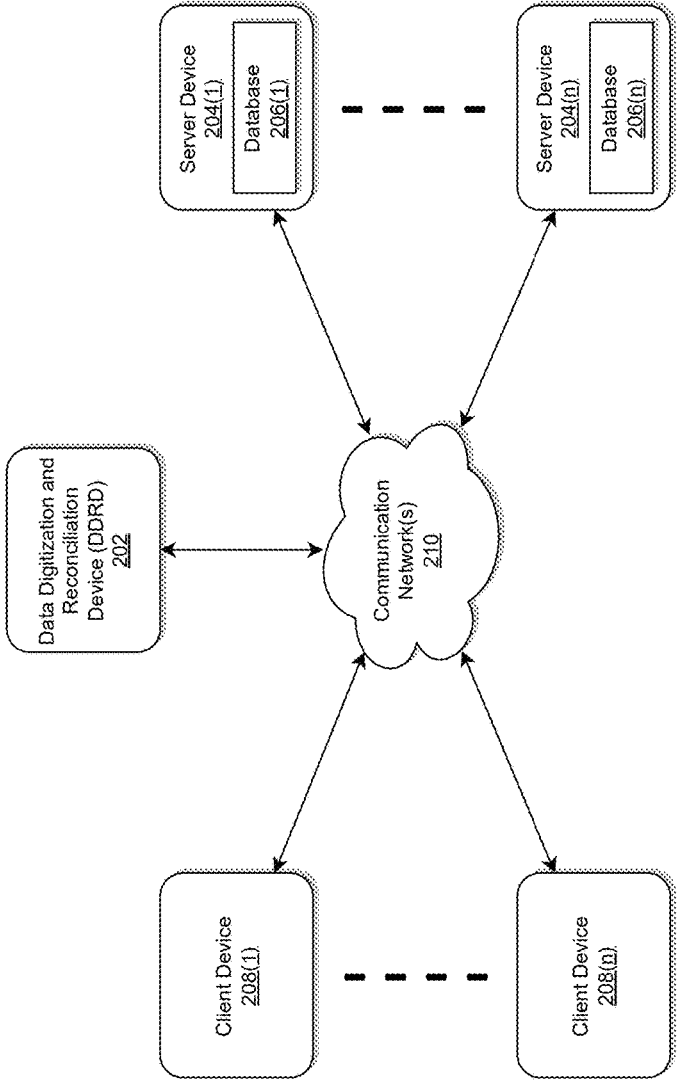
FIG. 2 illustrates an exemplary diagram of a network environment with a platform, language, database, and cloud agnostic data digitization and reconciliation device in accordance with an exemplary embodiment.

Referring to FIG. 2, a schematic of an exemplary network environment 200 for implementing a language, platform, database, and cloud agnostic data digitization and reconciliation device (DDRD) of the instant disclosure is illustrated.

According to exemplary embodiments, the above-described problems associated with conventional tools may be overcome by implementing an DDRD 202 as illustrated in FIG. 2 that may be configured for implementing a platform, language, database, and cloud agnostic data digitization and reconciliation module configured to systemically and dynamically convert questionnaire data into a machine-readable format and identifying missing as well as insufficient responses based on predefined guidelines, but the disclosure is not limited thereto.

The DDRD 202 may have one or more computer system 102s, as described with respect to FIG. 1, which in aggregate provide the necessary functions.

The DDRD 202 may store one or more applications that can include executable instructions that, when executed by the DDRD 202, cause the DDRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDRD 202 itself, may be located in virtual server(s) running in a cloud-based computing environment rather than being tied to one or more specific physical network computing devices. Also, the application(s) may be running in one or more virtual machines (VMs) executing on the DDRD 202. Additionally, in one or more embodiments of this technology, virtual machine(s) running on the DDRD 202 may be managed or supervised by a hypervisor.

In the network environment 200 of FIG. 2, the DDRD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the DDRD 202, such as the network interface 114 of the computer system 102 of FIG. 1, operatively couples and communicates between the DDRD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDRD 202, the server devices 204(1)-204 (*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDRD 202 may be a standalone device or integrated with one or more other devices or apparatuses, such as one or more of the server devices 204(1)-204(*n*), for example. In one particular example, the DDRD 202 may be hosted by one of the server devices 204(1)-204(*n*), and other arrangements are also possible. Moreover, one or more of the devices of the DDRD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the DDRD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the DDRD 202 that may efficiently provide a platform for implementing a platform, language, database, and cloud agnostic data digitization and reconciliation module configured to automatically and dynamically convert questionnaire data into a machine-readable format and identifying missing as well as insufficient responses based on predefined guidelines, but the disclosure is not limited thereto.

The client devices 208(1)-208(*n*) may run interface applications, such as standard web browsers or standalone client applications, which may provide an interface to communicate with the DDRD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the DDRD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DDRD 202, the server devices 204(1)-204(*n*), or the client devices 208(1)-208(*n*), for example, may be configured to operate as virtual instances on the same physical machine. For example, one or more of the DDRD 202, the server devices 204(1)-204(*n*), or the client devices 208(1)-208(*n*) may operate on the same physical device rather than as separate devices communicating through communication network(s) 210. Additionally, there may be more or fewer DDRDs 202, server devices 204(1)-204(*n*), or client devices 208(1)-208(*n*) than illustrated in FIG. 2. According to exemplary embodiments, the DDRD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
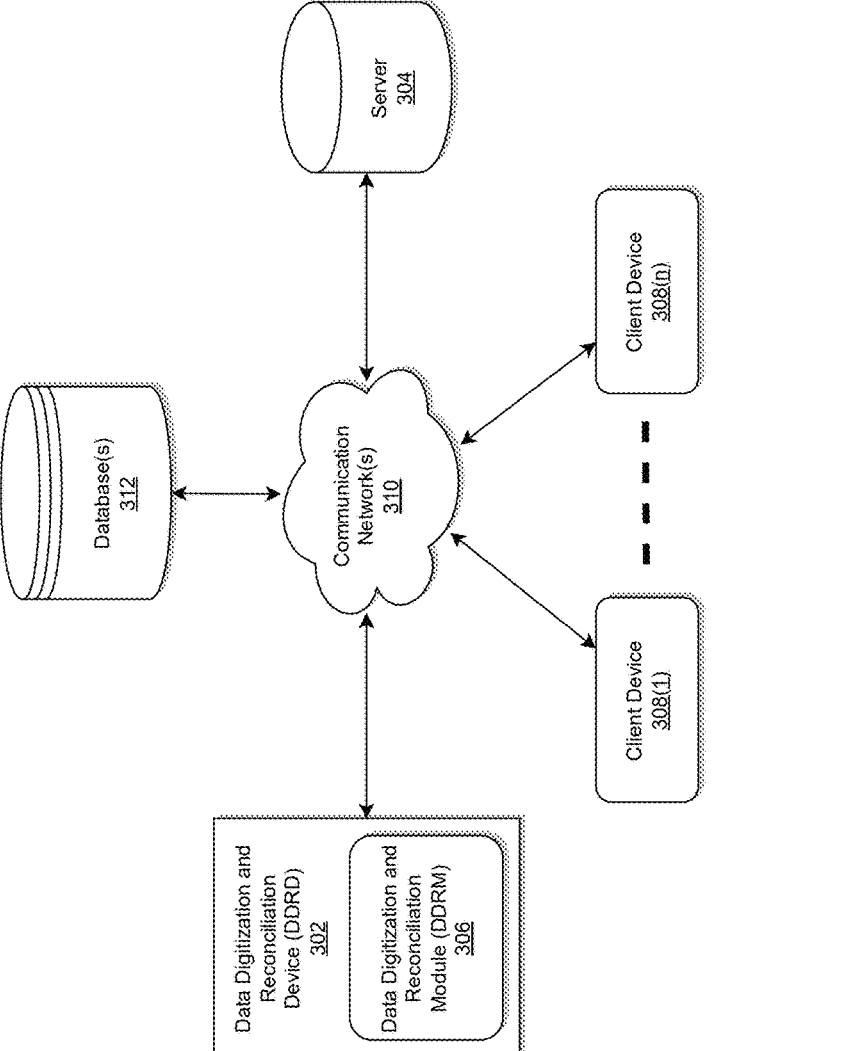
FIG. 3 illustrates a system diagram for implementing a platform, language, database, and cloud agnostic data digitization and reconciliation device having a platform, language, database, and cloud agnostic data digitization and reconciliation module in accordance with an exemplary embodiment.

FIG. 3 illustrates a system diagram for implementing a platform, language, and cloud agnostic DDRD having a platform, language, database, and cloud agnostic data digitization and reconciliation module (DDRM) in accordance with an exemplary embodiment.

As illustrated in FIG. 3, the system 300 may include an DDRD 302 within which an DDRM 306 is embedded, a server 304, a database(s) 312, a plurality of client devices 308(1) . . . 308(*n*), and a communication network 310.

According to exemplary embodiments, the DDRD 302 including the DDRM 306 may be connected to the server 304, and the database(s) 312 via the communication network 310. The DDRD 302 may also be connected to the plurality of client devices 308(1) . . . 308(*n*) via the communication network 310, but the disclosure is not limited thereto.

According to exemplary embodiment, the DDRD 302 is described and shown in FIG. 3 as including the DDRM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the DDRM 306 may be configured to receive real-time feed of data from the plurality of client devices 308(1) . . . 308(*n*) and secondary sources via the communication network 310.

As may be described below, the DDRM 306 may be configured to: implement an automated email tool into a data flow pipeline, wherein the email tool generates an autonomous program for continuously monitoring shared mailbox for unread emails originated from a computing system, wherein the computing system is utilized for reviewing a document including questionnaire data containing a plurality of line items filled out by a client utilizing a client computing device; fetch, in response to determining that the shared mailbox contains unread emails, the document as attached to an unread email from the automated email tool and storing in a shared drive; access the document from the shared drive; implement an OCR tool into the data flow pipeline; convert, by utilizing the OCR tool, the questionnaire data containing the plurality of line items into a machine-readable format data; implement an automated reconciliation tool into the data flow pipeline; read, by the automated reconciliation tool, the machine-readable format data for each line item; compare, by the automated reconciliation tool, data for each line item against a corresponding predefined guidance data; identify, based on comparing, by the automated reconciliation tool, missing response data, negative response data, and insufficient response data corresponding to the questionnaire data filled out by the client by applying predefined rules; and automatically reconcile the missing response data, negative response data, and insufficient response data, but the disclosure is not limited thereto.

The plurality of client devices 308(1) . . . 308(*n*) are illustrated as being in communication with the DDRD 302. In this regard, the plurality of client devices 308(1) . . . 308(*n*) may be "clients" (e.g., customers) of the DDRD 302 and are described herein as such. Nevertheless, it is to be known and understood that the plurality of client devices 308(1) . . . 308(*n*) need not necessarily be "clients" of the DDRD 302, or any entity described in association therewith herein. Any additional or alternative relationship may exist between either or both of the plurality of client devices 308(1) . . . 308(*n*) and the DDRD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the DDRD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The DDRD 302 may be the same or similar to the DDRD 202 as described with respect to FIG. 2, including any features or combination of features described with respect thereto.

Figure 4:
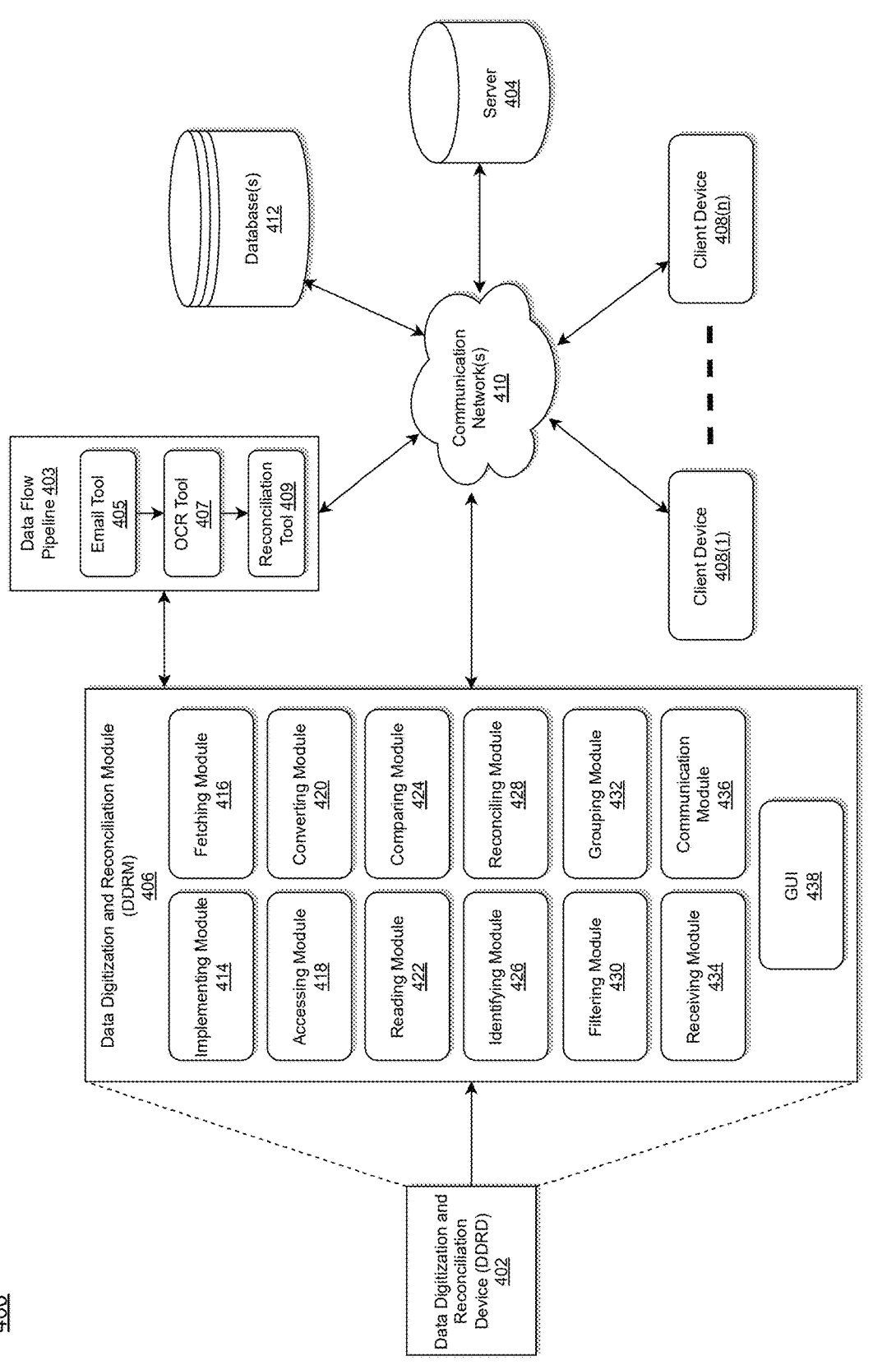
FIG. 4 illustrates a system diagram for implementing a platform, language, database, and cloud agnostic data digitization and reconciliation module of FIG. 3 in accordance with an exemplary embodiment.

FIG. 4 illustrates a system diagram for implementing a platform, language, database, and cloud agnostic DDRM of FIG. 3 in accordance with an exemplary embodiment.

According to exemplary embodiments, the system 400 may include a platform, language, database, and cloud agnostic DDRD 402 within which a platform, language, database, and cloud agnostic DDRM 406 is embedded, a data flow pipeline 403, a server 404, database(s) 412, and a communication network 410. According to exemplary embodiments, server 404 may comprise a plurality of servers located centrally or located in different locations, but the disclosure is not limited thereto.

According to exemplary embodiments, the DDRD 402 including the DDRM 406 may be connected to the server 404, the data flow pipeline 403, and the database(s) 412 via the communication network 410. The DDRD 402 may also be connected to the plurality of client devices 408(1)-408(*n*) via the communication network 410, but the disclosure is not limited thereto. The DDRM 406, the server 404, the plurality of client devices 408(1)-408(*n*), the database(s) 412, the communication network 410 as illustrated in FIG. 4 may be the same or similar to the DDRM 306, the server 304, the plurality of client devices 308(1)-308(*n*), the database(s) 312, the communication network 310, respectively, as illustrated in FIG. 3.

According to exemplary embodiments, as illustrated in FIG. 4, the DDRM 406 may include an implementing module 414, a fetching module 416, an accessing module 418, a converting module 420, a reading module 422, a comparing module 424, an identifying module 426, a reconciling module 428, a filtering module 430, a grouping module 432, a receiving module 434, a communication module 436, and a GUI 438. According to exemplary embodiments, interactions and data exchange among these modules included in the DDRM 406 provide the advantageous effects of the disclosed invention. Functionalities of each module of FIG. 4 may be described in detail below with reference to FIGS. 4-8.

According to exemplary embodiments, each of the implementing module 414, fetching module 416, accessing module 418, converting module 420, reading module 422, comparing module 424, identifying module 426, reconciling module 428, filtering module 430, grouping module 432, receiving module 434, and the communication module 436 of the DDRM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, fetching module 416, accessing module 418, converting module 420, reading module 422, comparing module 424, identifying module 426, reconciling module 428, filtering module 430, grouping module 432, receiving module 434, and the communication module 436 of the DDRM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, fetching module 416, accessing module 418, converting module 420, reading module 422, comparing module 424, identifying module 426, reconciling module 428, filtering module 430, grouping module 432, receiving module 434, and the communication module 436 of the DDRM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the DDRM 406 of FIG. 4 may also be implemented by Cloud based deployment.

According to exemplary embodiments, each of the implementing module 414, fetching module 416, accessing module 418, converting module 420, reading module 422, comparing module 424, identifying module 426, reconciling module 428, filtering module 430, grouping module 432, receiving module 434, and the communication module 436 of the DDRM 406 of FIG. 4 may be called via corresponding API, but the disclosure is not limited thereto. For example, calls may also be made using Event based message interfaces in addition to APIs.

According to exemplary embodiments, the process implemented by the DDRM 406 may be executed via the communication module 436 and the communication network 410, which may comprise plural networks as described above. For example, in an exemplary embodiment, the various components of the DDRM 406 may communicate with the server 404, and the database(s) 412 via the communication module 436 and the communication network 410 and the results may be displayed onto the GUI 438. Of course, these embodiments are merely exemplary and are not limiting or exhaustive. The database(s) 412 may include the databases included within the private cloud and/or public cloud and the server 404 may include one or more servers within the private cloud and the public cloud.

According to exemplary embodiments, the implementing module 414 may be configured to implement an automated email tool 405 into a data flow pipeline 403, wherein the email tool 405 generates an autonomous program for continuously monitoring shared mailbox for unread emails originated from a computing system where the client device 408(1)-408(n) are connected. The computing system is utilized for reviewing a document including questionnaire data containing a plurality of line items filled out by a client utilizing client device 408(1)-408(n). According to exemplary embodiments, the questionnaire data may include CBDDQ data, but the disclosure is not limited thereto.

According to exemplary embodiments, the fetching module 416 may be configured to fetch, in response to determining that the shared mailbox contains unread emails, the document as attached to an unread email from the automated email tool 405 and store in a shared drive (i.e., server 404).

According to exemplary embodiments, the accessing module 418 may be configured to access the document from the shared drive, i.e., the server 404.

According to exemplary embodiments, the implementing module 414 may be configured to implement an OCR tool 407 into the data flow pipeline 403. The converting module 420 may be configured to convert, by utilizing the OCR tool 407, the questionnaire data containing the plurality of line items into a machine-readable format data.

According to exemplary embodiments, the implementing module 414 may be further configured to implement an automated reconciliation tool 409 into the data flow pipeline 403. The reading module 422 may be configured to read, by the automated reconciliation tool 409, the machine-readable format data for each line item.

According to exemplary embodiments, the comparing module 424 may be configured to compare, by utilizing the automated reconciliation tool 409, data for each line item against a corresponding predefined guidance data.

According to exemplary embodiments, the identifying module 426 may be configured to identify, based on comparing, by utilizing the automated reconciliation tool 409, missing response data, negative response data, and insufficient response data corresponding to the questionnaire data filled out by the client by applying predefined rules. The reconciling module 428 may be configured to automatically reconcile the missing response data, negative response data, and insufficient response data by utilizing the reconciliation tool 409.

According to exemplary embodiments, in automatically reconciling, the filtering module 430 may be configured to filter the missing response data among response data filled out by the client; and the grouping module 432 may be configured to group the missing response data into a first file.

According to exemplary embodiments, the filtering module 430 may be configured to filter the negative response data among the response data filled out by the client; and the grouping module 432 may be configured to group the negative response data into a second file.

According to exemplary embodiments, the filtering module 430 may be configured to filter the insufficient response data among the response data filled out by the client; and the grouping module 432 may be configured to group the insufficient response data into a third file.

According to exemplary embodiments, the communication module 436 may be configured to transmit the first file, the second file, and the third file as output to the client computing device, i.e., 408(1)-408(n) via a communication interface; the receiving module 434 may be configured to receive input data from client corresponding to each of the missing response data, the negative response data, and the insufficient response data; and the converting module 420 repeats the converting process, the reading module 422 repeats the reading process, the comparing module 420 repeats the comparing process, the identifying module 426 repeats the identifying process, and the reconciling module 428 repeats the automatically reconciling process on the received input data in a similar manner as disclosed above.

According to exemplary embodiments, the implementing module 414 may be further configured to implement artificial intelligence and machine learning algorithm into the automated reconciliation tool 409 for automatically reconciling the missing response data, negative response data, and insufficient response.

According to exemplary embodiments, output files may be in .csv format, but the disclosure is not limited thereto.

FIG. 5 illustrates an exemplary table 500 of output data generated by the platform, language, database, and cloud agnostic DDRM 406 of FIG. 4 in accordance with an exemplary embodiment. According to exemplary embodiments, the DDRM 406 may be utilized as an analytical tool on documents where the average confidence of prediction on the 334 fields in the CBDDQ is more than 80%. Confidence threshold of 80% was selected after multiple manual reviews. It was found that the OCR conversions met the expected standards when the average threshold was more than 80%, but the disclosure is not limited to 80% threshold. Other threshold may be utilized without departing from the scope of the present disclosure.

According to exemplary embodiments, the DDRM 406 may be utilized for data analysis by using processing rate as a metric. The processing rate may be a ratio between the number of documents processed and the total number of documents submitted (Processing Rate=(Number of Documents Processed)/(Total Number of Documents Submitted). According to exemplary embodiments, a threshold for processing rate be 0.5 or 50%, but the disclosure is not limited thereto. An example is presented in the table 500 of FIG. 5. Sixteen CBDDQs are submitted to the DDRM 406. Outputs are generated for 10 of them. The processing rate in this example is $^{10}/_{16}$=0.625=62.5%.

Figure 6:
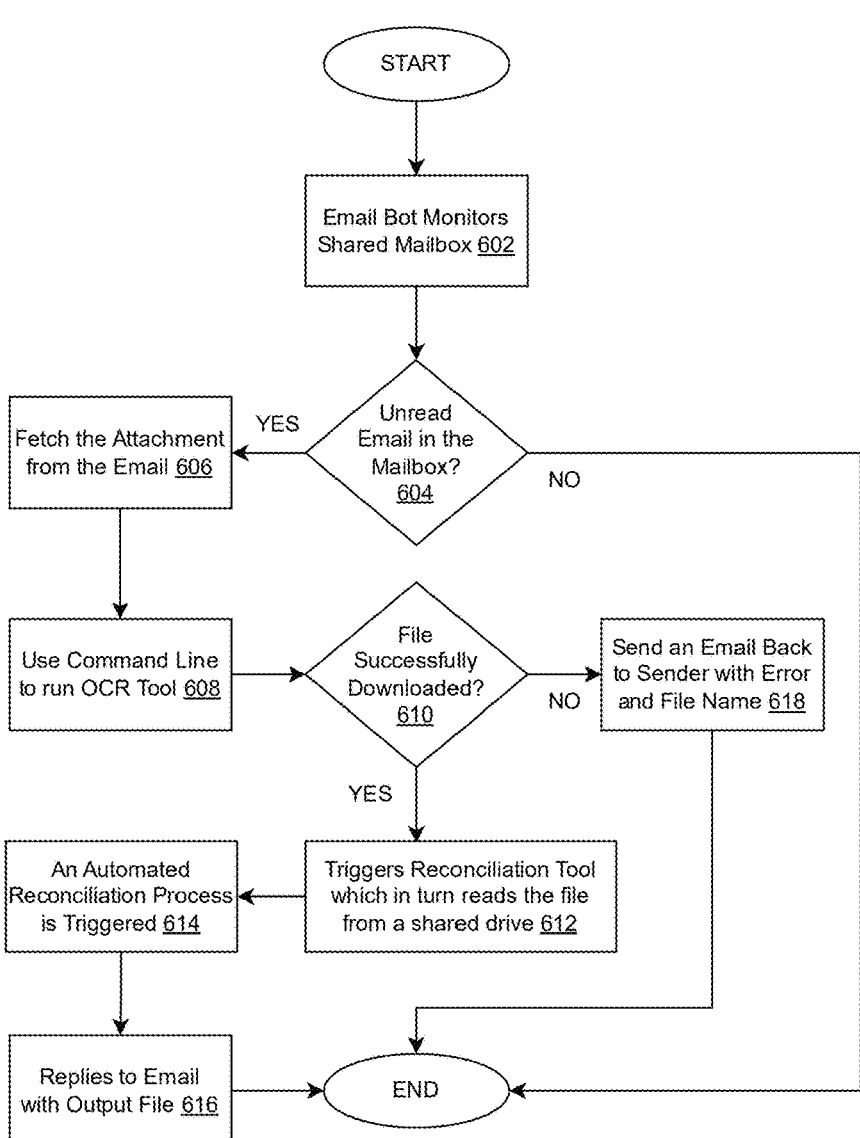
FIG. 6 illustrates an exemplary data flow process implemented by the platform, language, database, and cloud agnostic data digitization and reconciliation module of FIG. 4 in accordance with an exemplary embodiment.

FIG. 6 illustrates an exemplary data flow process 600 implemented by the platform, language, database, and cloud agnostic DDRM 406 of FIG. 4 in accordance with an exemplary embodiment. The tool implemented by the DDRM 406 may be built using a combination of tools. The tool may utilize an automation bot to save the required emails from a shared email into a downloads folder. A user interface path may be utilized to crate the data flow pipeline 403 as illustrated in FIG. 6. For example, the tool may utilize the OCR tool 407 to convert the images to machine readable format and reconciliation rules as described herein to trigger the final automation checks.

Referring back to FIGS. 4 and 6, the first tool in the exemplary data flow process 600 is the email BOT, i.e., email tool 405. As illustrated in FIG. 6, at step 602 the email tool 405 monitors the shared mailbox for unread emails. At step 604, it is determined whether there are unread emails in the shared mailbox. When it is determined at step 604 that there are no unread emails in the shared mailbox, the data flow process 600 ends.

However, when it is determined that there are unread emails in the shared mailbox, according to exemplary embodiments, the data flow process flows to step 606 where the email tool 405 fetches the attachments from the email and stores them into one folder. At step 608, the data flow process 600 utilizes command line to run the OCR tool 407. The OCR tool 407 outputs characters after reading the scans that the data flow pipeline 403 fed to it and stores the output onto a shared drive along with the full timestamp as a CSV file.

At step 610, it is determined whether the CSV file is successfully downloaded. When it is determined at step 610 that the CSV file has not been downloaded, the data flow process 600 proceeds to step 618 where an email is sent back to the sender with error and file name. However, when it is determined at step 610 that the CSV file has been downloaded successfully, the data flow process 600 proceeds to step 612 where the reconciliation tool is triggered which in turn reads the CSV file from the shared drive. Next the data flow process 600 triggers an automated reconciliation process at step 614 to generate an output file.

According to exemplary embodiments, the automated reconciliation process may include the reading process, the comparing process, the identifying process, and the automatically reconciling process on the received file to generate the output file based on predefined rules as disclosed above with respect to FIG. 4. For example, the automated reconciliation process may pick up the questionnaire data filled in by the client and matches it against an escalation guidance. Next, blank responses are filtered and grouped together into one file, list of negative responses are also grouped into a second file and insufficient responses are grouped into a third file. All the steps carried out in the automated reconciliation process are rule based and deterministic steps.

At step 616, according to exemplary embodiments, the generated outputs may be emailed to the client and may displayed on to the GUI 438. FIG. 7 illustrates another exemplary table 700 of output data generated by the platform, language, database, and cloud agnostic DDRM 406 of FIG. 4 in accordance with an exemplary embodiment.

According to exemplary embodiments, the OCR tool 407 as implemented by the data flow pipeline 403 of FIG. 4 in the data flow process 600 of FIG. 6, first identifies "key points" within each scan and, matches them against the "Keypoints" detected in the template using known homography. Once areas of interest are identified, the text from each area is extracted using a machined learning model.

According to exemplary embodiments, "Keypoints" are features of the image that are distinct which help one find where the segments of an image should fit in if a whole image is given. These could be corners edges etc. In image processing a common corner detection algorithm used is the "Harris Corner detector". This corner detector finds the difference in intensity of an image when a small window is displaced by (u,v) in all directions. This is expressed as below:

$$E(u, v) = \sum_{x,y} w(x, y) \left[ I(x + u, y + v) - I(x, y) \right]^2$$

where, w(x,y) is the window function is either a rectangular window or a Gaussian window which gives weights to pixels underneath. The idea is to maximize E(u,v) for corner detection. Applying Taylor Expansion to the above equation and using some mathematical steps, the final equation is output as:

$$E(u, v) \approx [u \ \ v] M \begin{bmatrix} u \\ v \end{bmatrix}$$

Where, $$M = \sum_{x,y} w(x, y) \begin{bmatrix} I_x I_x & I_x I_y \\ I_x I_y & I_y I_y \end{bmatrix}$$

Here, $I_x$ and $I_x$ are image derivatives in x and y directions respectively.

After this, the following equation determines if a window can contain a corner or not.

$$R = \det(M) - k(\text{trace}(M))^2$$

Where, $\det(M) = \lambda_1 \lambda_2$; $\text{trace}(M) = \lambda_1 + \lambda_2$; $\lambda_1$ and $\lambda_2$ are the eigen values of M. The magnitudes of these eigenvalues determine whether a region is a corner, an edge, or flat. When |R| is small, which happens when $\lambda_1$ and $\lambda_2$ are small, the region is flat. When R<0, which happens when $\lambda_1 >> \lambda_2$ or vice versa, the region is edge. When R is large, which happens when $\lambda_1$ and $\lambda_2$ are large and $\lambda_1 \sim \lambda_2$, the region is a corner.

Harris Corner detection is rotation invariant which means, even if the image is rotated, we can find the same corners. A corner in a small image within a small window is flat when it is zoomed in the same window. Commonly known Scale-Invariant Feature Transform or SIFT may overcome this limitation. There are mainly four steps involved in SIFT algorithm. SIFT algorithm uses Difference of Gaussians (DoG) which is an approximation of Laplace of Gaussian (LoG). DoG is obtained as the difference of Gaussian blurring of an image with two different $\sigma$, let it be $\sigma$ and $k\sigma$. Once this DoG are found, images are searched for local extrema over scale and space. For example, one pixel in an image is compared with its 8 neighbors as well as 9 pixels in next scale and 9 pixels in previous scales. If it is a local extrema, it is a potential keypoint.

Once potential keypoints locations are found, they have to be refined to get more accurate results. According to exemplary embodiments, Taylor series expansion of scale space may be utilized to get more accurate location of extrema, and if the intensity at this extrema is less than a threshold value (0.03 as per the paper), it is rejected.

DoG has higher response for edges, so edges also need to be removed. For this, a concept similar to Harris corner detector may be utilized, i.e., a 2×2 Hessian matrix (H) to compute the principal curvature. It is known from Harris corner detector that for edges, one eigen value is larger than the other. A predetermined threshold, i.e., edge threshold, is utilized to determine whether to discard a keypoint. Thus, it eliminates any low-contrast keypoints and edge keypoints and what remains is strong interest points.

According to exemplary embodiments, an orientation is assigned to each keypoint to achieve invariance to image rotation. A neighborhood is taken around the keypoint location depending on the scale, and the gradient magnitude and direction is calculated in that region. An orientation histogram with 36 bins covering 360 degrees is created (It is weighted by gradient magnitude and gaussian-weighted circular window with σ equal to 1.5 times the scale of keypoint). The highest peak in the histogram is taken and any peak above 80% of it is also considered to calculate the orientation. It creates keypoints with same location and scale, but different directions. It contribute to stability of matching.

According to exemplary embodiments, a keypoint descriptor is created. A 16×16 neighborhood around the keypoint is taken. It is divided into 16 sub-blocks of 4×4 size. For each sub-block, 8 bin orientation histogram is created. So, a total of 128 bin values are available. It is represented as a vector to form keypoint descriptor. In addition to this, several measures are taken to achieve robustness against illumination changes, rotation etc.

According to exemplary embodiments, Keypoints between two images are matched by identifying their nearest neighbors. But in some cases, the second closest-match may be very near to the first. It may happen due to noise or some other reasons. In that case, ratio of closest-distance to second-closest distance is taken. If it is greater than 0.8, they are rejected. It eliminates around 90% of false matches while discards only 5% correct matches in accordance with exemplary embodiments described herein.

According to exemplary embodiments, the OCR tool 407 may implement an OCR engine that is based on Long Short-Term Memory (LSTM) networks.

FIG. 8 illustrates an exemplary flow chart of a process 800 implemented by the platform, language, database, and cloud agnostic DDRM 406 of FIG. 4 for systemically and dynamically converting questionnaire data into a machine-readable format and identifying missing as well as insufficient responses based on predefined guidelines in accordance with an exemplary embodiment. It may be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include implementing an automated email tool into a data flow pipeline. The email tool generates an autonomous program for continuously monitoring shared mailbox for unread emails originated from a computing system. The computing system is utilized for reviewing a document including questionnaire data containing a plurality of line items filled out by a client utilizing a client computing device.

At step S804, the process 800 may include fetching, in response to determining that the shared mailbox contains unread emails, the document as attached to an unread email from the automated email tool and storing in a shared drive.

At step S806, the process 800 may include accessing the document from the shared drive.

At step S808, the process 800 may include implementing an OCR tool into the data flow pipeline.

At step S810, the process 800 may include converting, by utilizing the OCR tool, the questionnaire data containing the plurality of line items into a machine-readable format data.

At step S812, the process 800 may include implementing an automated reconciliation tool into the data flow pipeline.

At step S814, the process 800 may include reading, by the automated reconciliation tool, the machine-readable format data for each line item.

At step S816, the process 800 may include comparing, by the automated reconciliation tool, data for each line item against a corresponding predefined guidance data.

At step S818, the process 800 may include identifying, based on comparing, by the automated reconciliation tool, missing response data, negative response data, and insufficient response data corresponding to the questionnaire data filled out by the client by applying predefined rules.

At step S820, the process 800 may include automatically reconciling the missing response data, negative response data, and insufficient response data.

According to exemplary embodiments, in automatically reconciling, the process 800 may further include: filtering the missing response data among response data filled out by the client; and grouping the missing response data into a first file.

According to exemplary embodiments, the process 800 may further include: filtering the negative response data among the response data filled out by the client; and grouping the negative response data into a second file.

According to exemplary embodiments, the process 800 may further include: filtering the insufficient response data among the response data filled out by the client; and grouping the insufficient response data into a third file.

According to exemplary embodiments, the process 800 may further include: transmitting the first file, the second file, and the third file as output to the client computing device via a communication interface; receiving input data from client corresponding to each of the missing response data, the negative response data, and the insufficient response data; and repeating the converting process, the reading process, the comparing process, the identifying process, and the automatically reconciling process on the received input data.

According to exemplary embodiments, in the process 800, the questionnaire data may include CBDDQ data, but the disclosure is not limited thereto.

According to exemplary embodiments, the process 800 may further include: implementing artificial intelligence and machine learning algorithm into the automated reconciliation tool for automatically reconciling the missing response data, negative response data, and insufficient response.

According to exemplary embodiments, the DDRD 402 may include a memory (e.g., a memory 106 as illustrated in FIG. 1) which may be a non-transitory computer readable medium that may be configured to store instructions for implementing a platform, language, database, and cloud agnostic DDRM 406 for systemically and dynamically converting questionnaire data into a machine-readable format and identifying missing as well as insufficient responses based on predefined guidelines as disclosed herein. The DDRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DDRM 406 or within the DDRD 402, may be used to perform one or more of the methods and processes as described herein. In a particular embodiment, the instructions may reside completely, or at least partially, within memory 106, the medium reader 112, and/or the processor 104 (see FIG. 1) during execution by the DDRD 402.

According to exemplary embodiments, the instructions, when executed, may cause a processor embedded within the DDRM 406 or the DDRD 402 to perform the following: implementing an automated email tool into a data flow pipeline, wherein the email tool generates an autonomous program for continuously monitoring shared mailbox for unread emails originated from a computing system, wherein the computing system is utilized for reviewing a document including questionnaire data containing a plurality of line items filled out by a client utilizing a client computing device; fetching, in response to determining that the shared mailbox contains unread emails, the document as attached to an unread email from the automated email tool and storing in a shared drive; accessing the document from the shared drive; implementing an OCR tool into the data flow pipeline; converting, by utilizing the OCR tool, the questionnaire data containing the plurality of line items into a machine-readable format data; implementing an automated reconciliation tool into the data flow pipeline; reading, by the automated reconciliation tool, the machine-readable format data for each line item; comparing, by the automated reconciliation tool, data for each line item against a corresponding predefined guidance data; identifying, based on comparing, by the automated reconciliation tool, missing response data, negative response data, and insufficient response data corresponding to the questionnaire data filled out by the client by applying predefined rules; and automatically reconciling the missing response data, negative response data, and insufficient response data. According to exemplary embodiments, the processor may be the same or similar to the processor 104 as illustrated in FIG. 1 or the processor embedded within the DDRD 202, DDRD 302, DDRD 402, and DDRM 406 which is the same or similar to the processor 104.

According to exemplary embodiments, in automatically reconciling, the instructions, when executed, may cause the processor 104 to further perform the following: filtering the missing response data among response data filled out by the client; and grouping the missing response data into a first file.

According to exemplary embodiments, the instructions, when executed, may cause the processor 104 to further perform the following: filtering the negative response data among the response data filled out by the client; and grouping the negative response data into a second file.

According to exemplary embodiments, the instructions, when executed, may cause the processor 104 to further perform the following: filtering the insufficient response data among the response data filled out by the client; and grouping the insufficient response data into a third file.

According to exemplary embodiments, the instructions, when executed, may cause the processor 104 to further perform the following: transmitting the first file, the second file, and the third file as output to the client computing device via a communication interface; receiving input data from client corresponding to each of the missing response data, the negative response data, and the insufficient response data; and repeating the converting process, the reading process, the comparing process, the identifying process, and the automatically reconciling process on the received input data.

According to exemplary embodiments, the instructions, when executed, may cause the processor 104 to further perform the following: implementing artificial intelligence and machine learning algorithm into the automated reconciliation tool for automatically reconciling the missing response data, negative response data, and insufficient response.

According to exemplary embodiments as disclosed above in FIGS. 1-8, technical improvements effected by the instant disclosure may include a platform for implementing a platform, language, database, and cloud agnostic data digitization and reconciliation module configured to systemically and dynamically convert questionnaire data into a machine-readable format and identifying missing as well as insufficient responses based on predefined guidelines, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for questionnaire data digitization and reconciliation by utilizing one or more processors along with allocated memory, the method comprising:

implementing an automated email tool into a data flow pipeline, wherein the email tool generates an autonomous program for continuously monitoring a shared mailbox for unread emails originated from a computing system, wherein the computing system is utilized for reviewing a document including questionnaire data containing a plurality of line items filled out by a client utilizing a client computing device;

fetching, in response to determining that the shared mailbox contains unread emails, the document as attached to an unread email and storing the document in a shared drive;

accessing the document from the shared drive; implementing an optical character recognition (OCR) tool into the data flow pipeline;

converting, using the OCR tool, the questionnaire data containing the plurality of line items into machine-readable format data;

implementing an automated reconciliation tool into the data flow pipeline;

reading, by the automated reconciliation tool, the machine-readable format data for each line item;

comparing, by the automated reconciliation tool, data for each line item against a corresponding predefined guidance data;

identifying, based on comparing, by the automated reconciliation tool, missing response data, negative response data, and insufficient response data corresponding to the questionnaire data filled out by the client by applying predefined rules; and automatically reconciling the missing response data, negative response data, and insufficient response data, wherein the automatically reconciling comprises:

filtering the missing response data from the questionnaire data and grouping the missing response data into a first file;

filtering the negative response data from the questionnaire data and grouping the negative response data into a second file; and filtering the insufficient response data from the questionnaire data and grouping the insufficient response data into a third file;

transmitting the first file, the second file, and the third file as output to the client computing device via a communication interface;

receiving input data from the client corresponding to each of the missing response data, the negative response data, and the insufficient response data; and repeating the converting, the reading, the comparing, the identifying, and the automatically reconciling on the received input data, wherein the automated reconciliation tool and the OCR tool are implemented as part of a data digitization and reconciliation module that is platform, language, database, browser, and cloud agnostic, thereby enabling orchestration and passing of the questionnaire data through the data flow pipeline across various components, and wherein configuration or data files utilized by the data digitization and reconciliation module are stored in a configuration-based language format such that the data digitization and reconciliation module is tunable or modifiable for performance of without affecting the configuration or data files.

2. The method according to claim 1, wherein the questionnaire data includes Correspondent Banking Due Diligence Questionnaire (CBDDQ) data.

3. The method according to claim 1, further comprising: implementing an artificial intelligence and machine learning algorithm into the automated reconciliation tool for automatically reconciling the missing response data, negative response data, and insufficient response.

4. A system for questionnaire data digitization and reconciliation, the system comprising:

a processor; and a memory operatively connected to the processor via a communication interface, the memory storing computer readable instructions, when executed, causes the processor to:

implement an automated email tool into a data flow pipeline, wherein the email tool generates an autonomous program for continuously monitoring a shared mailbox for unread emails originated from a computing system, wherein the computing system is utilized for reviewing a document including questionnaire data containing a plurality of line items filled out by a client utilizing a client computing device;

fetch, in response to determining that the shared mailbox contains unread emails, the document as attached to an unread email and store the document in a shared drive;

access the document from the shared drive;

implement an optical character recognition (OCR) tool into the data flow pipeline;

convert, using the OCR tool, the questionnaire data containing the plurality of line items into machine-readable format data;

implement an automated reconciliation tool into the data flow pipeline;

read, using the automated reconciliation tool, the machine-readable format data for each line item;

compare, using the automated reconciliation tool, data for each line item against a corresponding predefined guidance data;

identify, based on the comparing, missing response data, negative response data, and insufficient response data corresponding to the questionnaire data by applying predefined rules; and automatically reconcile the missing response data, negative response data, and insufficient response data, wherein automatically reconciling comprises:

filtering the missing response data from the questionnaire data and group the missing response data into a first file;

filtering the negative response data from the questionnaire data and group the negative response data into a second file; and filtering the insufficient response data from the questionnaire data and group the insufficient response data into a third file;

transmit the first file, the second file, and the third file as output to the client computing device via a communication interface;

receive input data from the client corresponding to each of the missing response data, the negative response data, and the insufficient response data; and repeat the converting, the reading, the comparing, the identifying, and the automatically reconciling on the received input data, wherein the automated reconciliation tool and the OCR tool are implemented as part of a data digitization and reconciliation module that is platform, language, database, browser, and cloud agnostic, thereby enabling orchestration and passing of the questionnaire data through the data flow pipeline across various components, and wherein configuration or data files utilized by the data digitization and reconciliation module are stored in a configuration-based language format such that the data digitization and reconciliation module is tunable or modifiable for performance without affecting the configuration or data files.

5. The system according to claim 4, wherein the questionnaire data includes Correspondent Banking Due Diligence Questionnaire (CBDDQ) data.

6. The system according to claim 4, wherein the processor is further configured to: implement an artificial intelligence and machine learning algorithm into the automated reconciliation tool for automatically reconciling the missing response data, negative response data, and insufficient response.

7. A non-transitory computer readable medium configured to store having instructions stored thereon, wherein the instructions are executable to cause a processor to perform operations comprising:

implementing an automated email tool into a data flow pipeline, wherein the email tool generates an autonomous program for continuously monitoring a shared mailbox for unread emails originated from a computing system, wherein the computing system is utilized for reviewing a document including questionnaire data containing a plurality of line items filled out by a client utilizing a client computing device;

fetching, in response to determining that the shared mailbox contains unread emails, the document as attached to an unread email and storing the document in a shared drive;

accessing the document from the shared drive;

implementing an optical character recognition (OCR) tool into the data flow pipeline;

converting the questionnaire data containing the plurality of line items into machine-readable format data; implementing an automated reconciliation tool into the data flow pipeline; reading, by the automated reconciliation tool, the machine-readable format data for each line item;

comparing data for each line item against a corresponding predefined guidance data;

identifying, based on the comparing, missing response data, negative response data, and insufficient response data corresponding to the questionnaire data by applying predefined rules; and automatically reconciling the missing response data, negative response data, and insufficient response data, wherein the automatically reconciling comprises:

filtering the missing response data from the questionnaire data and grouping the missing response data into a first file:

filtering the negative response data from the questionnaire data and grouping the negative response data into a second file; and filtering the insufficient response data from the questionnaire data and grouping the insufficient response data into a third file;

transmitting the first file, the second file, and the third file as output to the client computing device via a communication interface;

receiving input data from the client corresponding to each of the missing response data, the negative response data, and the insufficient response data; and repeating the converting, the reading, the comparing, the identifying, and the automatically reconciling on the received input data, wherein the automated reconciliation tool and the OCR tool are implemented as part of a data digitization and reconciliation module that is platform, language, data-base, browser, and cloud agnostic, thereby enabling orchestration and passing of the questionnaire data through the data flow pipeline across various components, and wherein configuration or data files utilized by the data digitization and reconciliation module are stored in a configuration-based language format such that the data digitization and reconciliation module is tunable or modifiable for performance without affecting the configuration or data files.

8. The non-transitory computer readable medium according to claim 7, wherein the questionnaire data includes Correspondent Banking Due Diligence Questionnaire (CBDDQ) data and, wherein the operations further comprise: implementing an artificial intelligence and machine learning algorithm into the automated reconciliation tool for automatically reconciling the missing response data, negative response data, and insufficient response.

\* \* \* \* \*